W. T. S. PATE.
SCRAPER FOR VEHICLE WHEELS.
APPLICATION FILED NOV. 9, 1912. RENEWED APR. 6, 1915.
1,153,108.
Patented Sept. 7, 1915.
2 SHEETS—SHEET 2.
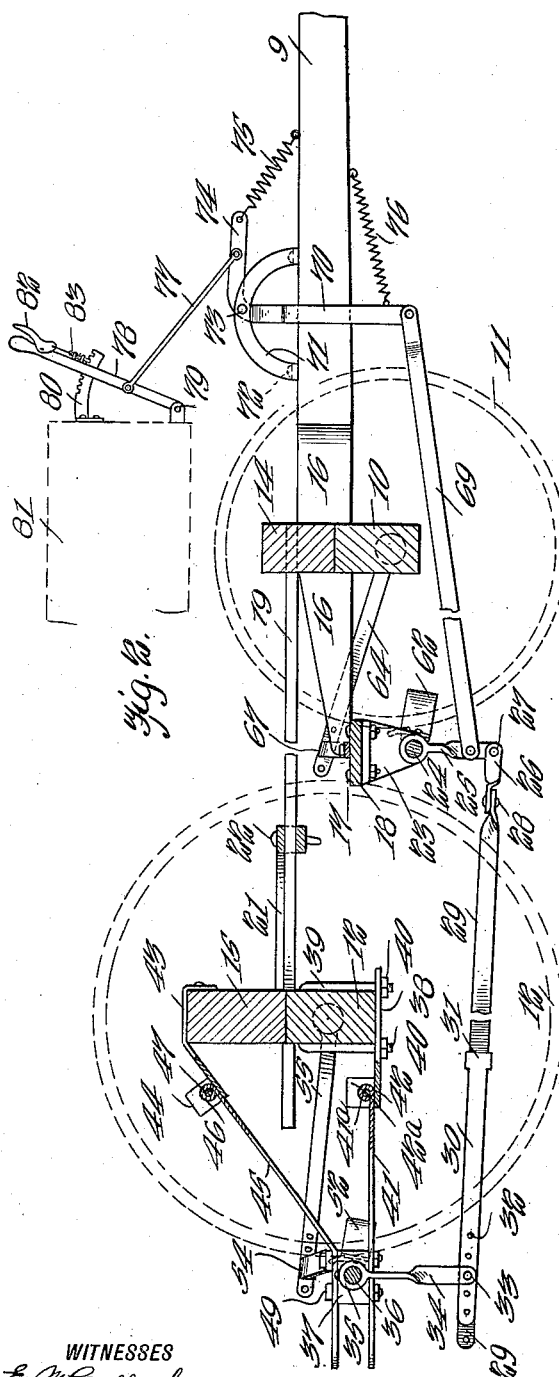
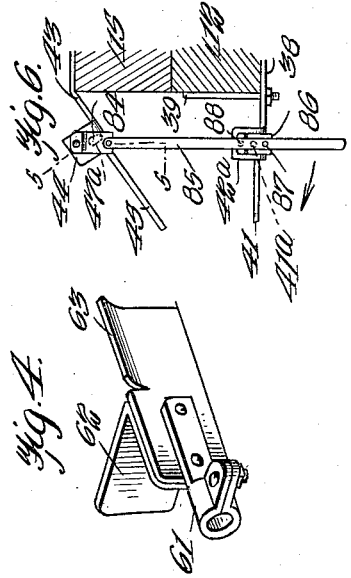
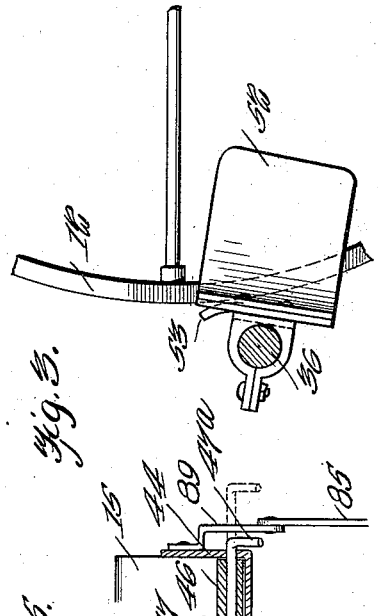
WITNESSES
E. M. Callaghan
Walton Harrison
INVENTOR
WILLIAM T. S. PATE,
BY Munn & Co.
ATTORNEYS

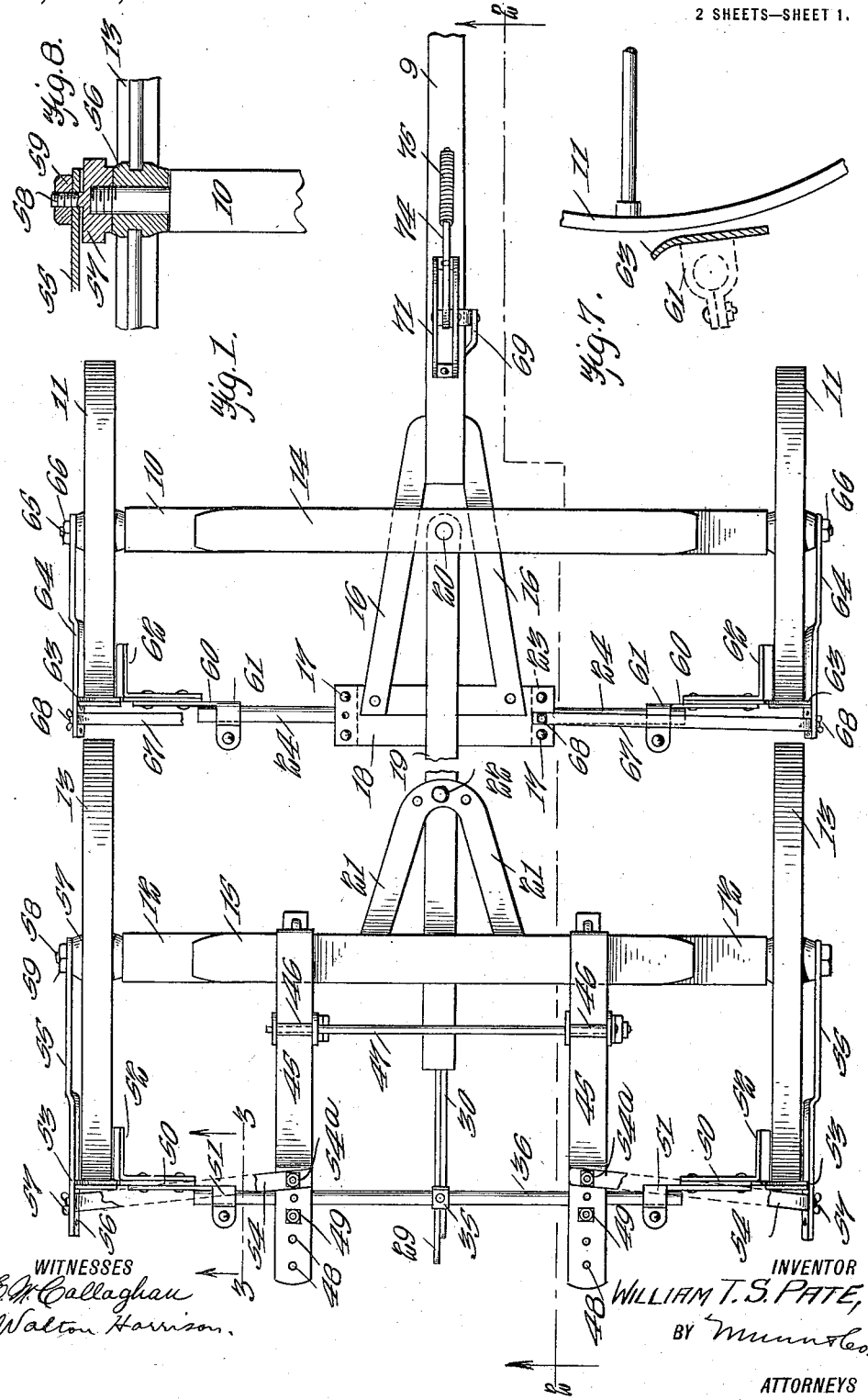

UNITED STATES PATENT OFFICE.

WILLIAM T. SHERMAN PATE, OF BLOOMINGTON, INDIANA, ASSIGNOR OF ONE-HALF TO HENRY P. SPLITSGERBER, OF BLOOMINGTON, INDIANA.

SCRAPER FOR VEHICLE-WHEELS.

1,153,108. Specification of Letters Patent. Patented Sept. 7, 1915.

Application filed November 9, 1912, Serial No. 730,399. Renewed April 6, 1915. Serial No. 19,567.

*To all whom it may concern:*

Be it known that I, WILLIAM T. S. PATE, a citizen of the United States, and a resident of Bloomington, in the county of Monroe and State of Indiana, have invented certain new and useful Improvements in Scrapers for Vehicle-Wheels, of which the following is a specification.

My invention relates to scrapers for vehicle wheels and while admitting of general application is of special adaptability for use upon wagon wheels for the purpose of cleaning mud from the wheels, the action being practically automatic.

My invention comprehends a number of scraper members having blades disposed in different positions relatively to different portions of the wheels, some of these blades being directly under control of the operator for the purpose of throwing them into and out of action.

My invention further relates to means whereby the scraper mechanism may be readily dismantled in order to allow the wagon bed to be tilted for the purpose of dumping a load.

My invention also contemplates a number of improvements in scraper mechanism generally for the purpose of increasing the efficiency of the same.

Reference is made to the accompanying drawings forming a part of this specification and in which like letters indicate like parts.

Figure 1 is a plan view partly broken away showing a wagon equipped with my improved scraper mechanism; Fig. 2 is a vertical section on the line 2—2 of Fig. 1 looking in the direction of the arrow; Fig. 3 is a detail showing one of the scrapers used in connection with one of the rear wheels of the wagon; Fig. 4 is a detail showing in perspective one of the scrapers associated with the front wheels but removed therefrom; Fig. 5 is a detail showing in section on the line 5—5 of Fig. 6 a portion of the means for dismantling the scraper mechanism; Fig. 6 is a fragmentary side elevation of the mechanism shown in Fig. 5; Fig. 7 is a detail showing one of the scraper blades and a portion of the wheel to be scraped by it; and, Fig. 8 is a detail showing in section how the scraper mechanism is supported partially by aid of the spindles of the rear axle.

The wagon tongue is shown at 9, the front axle at 10, and the front wheels at 11. The rear axle appears at 12 and the rear wheels at 13. The front axle beam is shown at 14 and the rear axle beam at 15. The front hounds are shown at 16 and are secured to the front axle 10 and the front axle beam 14 in the usual or any desired manner. The front hounds carry a supporting plate 18. The coupling pole is shown at 19, and by aid of a coupling pin 20 is connected with the front axle 16 and front axle beam 14. The rear hounds are shown at 21 and are connected by aid of a coupling pin 22 with the coupling pole 19. The supporting plate 18 carries a pair of brackets 23 mounted upon its underside by aid of bolts 17. These brackets serve as bearings. Journaled in them and extending through them is a rocking shaft 24. An arm 25 is connected rigidly with the rocking shaft 24 and extends downwardly therefrom. A link 26 is by aid of a pivot pin 27 connected with the lower end of the arm 25. This link 26 is also connected with a flat bar 29 by aid of a bolt 28. This bolt allows some adjustment of the link 26 relatively to the bar 29 and may be tightened so as to render these two parts rigid relatively to each other, and to all intents and purposes cause them to act as a single bar. Engaging one side of the bar 29 is another bar 30 provided with a sliding head 31 or eye which partially encircles the bar 29. The bar 30 is adjustable relatively to the bar 29, the eye 31 serving to maintain these bars in proper alinement. Both of these bars are provided with holes 32 and extending through a pair of these holes is a pivot pin 33. This pivot pin is carried by an arm 34 which depends from and is rigidly mounted upon a rocking shaft 36 somewhat similar to the rocking shaft 24 above described. The shaft 36 is mounted in bearings 37 supported as hereinafter described. Mounted upon the underside of the rear axle 12 is a plate 38 secured in position by aid of U-shaped brackets 39 carrying nuts 40 at their lower ends. These brackets 39 are adjustable relatively to the rear axle 12 and may be moved closer together or farther apart as desired thereby spacing the plates 38 (of which there are two) at any required distance apart. Disposed adjacent to the plates 38 are two flat bars 41 each provided with an eye 41$^a$. Extending through each eye 41ª is a pivot pin 42 which serves as a bearing and is supported by a pivot frame 42ª, the latter being secured rigidly upon the plate 42. There are two of the flat bars 41 and the parts associated with them are of course duplicated.

Mounted upon the rear axle beam 15 are two strap sections 43 and these carry bearing frames 44 similar to the bearing frames 42ª above described. Two strap sections 45, each having the form of a wide flat bar, are provided respectively with eyes 46, the latter being adapted to enter the bearing frames 44. A rod 47, which is of considerable length, extends through the two bearing frames 44 and through the two eyes 46 and serves to hold the strap sections 45 in engagement with the strap sections 43. When, however, the rod 47 is withdrawn, as hereinafter described, the strap sections 45 are disengaged from the strap sections 43. The rod 47 is provided with a head 47ª (see Fig. 5) by aid whereof the rod may be withdrawn as indicated by dotted lines in this figure. The strap sections 45 are at their rear ends (see Fig. 1) provided with holes 48. Bolts 49 extend through the bearings 37 (see Fig. 2) and through some of these holes, the bearings 37 being adjustable relatively to the strap sections. Mounted upon the ends of the rocking shaft 36 are arms 50 secured in position by aid of clamps 51. These arms 50 carry scraper blades 52 for engaging the inner annular faces of the rear wheel rims and also carry scraper blades 53 for engaging the peripheral surfaces of said rear wheels. A pair of arms 54 are by aid of bolts 54ª secured to the strap sections 45 extending directly outward therefrom as may be understood from Fig. 1. These arms are at their outer ends connected to two other arms 55 which extend forwardly toward the hubs 56 of the rear wheels. One of these hubs is shown more particularly in Fig. 8. The rear axle is provided at each of its ends with a spindle of the form shown in Fig. 8, this spindle at its outer end being provided with a thread. Revolubly mounted upon the spindle is a nut 57 which is provided centrally with a threaded boss 58, this boss extending through a hole in the adjacent end of the arm 55 and being engaged by a tap or nut 59 as indicated in Fig. 8. By loosening the nut 59 the arm 55 may be disengaged from the threaded boss 58 without disturbing the hub or the wheel 13.

Mounted upon the rocking shaft 24 by aid of clamps 61 are arms 60 carrying blades 62, 63 which are disposed adjacent to the front wheels 11 and are adapted for keeping the same clear of mud. Arms 64 disposed adjacent to these scraper blades are connected with threaded bosses 65 and held in position by nuts 66. These arms are adjustably connected with other arms 67 extending crosswise of the wagon and by aid of fastenings 68 secured to the ends of the supporting plate 18. The arm 64 may be disconnected from the bosses 65 and the arms 67 may be disconnected from the supporting plate 18. The arms 64, 67 need not be used at all unless their use is desired. The arms 64, are provided with portions bent slightly inward toward the adjacent outer faces of the rims of the wheels 11, 13, such portions thus serving as scraper blades for cleaning the wheels.

A link 69 (see Fig. 2) is pivotally connected with the arm 25 and with a lever 70. This lever is journaled upon a support 71, the latter being secured upon the wagon tongue 9 by aid of fastenings 72. The lever 70 is provided with a portion 74 integral with it and extending forwardly. A tensile spring 75 is connected with this forwardly projected portion and with the tongue 9. Another tensile spring 76 extends from the lower end of the lever 70 to the tongue 9. Normally the springs 75, 76 hold the lever 70 in the position indicated. Connected with the forwardly projecting portion 74 of the lever 70 is a link 77. This link is also connected to a hand lever 78 which is journaled at 79 upon the wagon bed 81. Mounted upon the wagon bed is a rack 80 having a substantially arcuate form and disposed adjacent to the path of travel of the hand lever 78. This hand lever carries a pawl 83 and a pawl handle 82 for actuating the pawl which is adapted to engage the upper or tooth edge of the rack 80 so as to hold the hand lever 78 in different angular positions into which it is moved from time to time.

At one side of the vehicle I provide two shields 84, 86 and pivotally mount the same upon the bearing frames 44, 42ª. Pivotally connected with the two shields just mentioned is a hand lever 85. The pivotal connection between this hand lever and the shield 86 is made by aid of a pivot pin 87. The shield 84 normally covers the head 47ª of the rod 47, and the shield 86 covers the head of the pivot pin 42, located directly below the rod 47. If, however, the hand lever 85 be moved bodily to the left, so as to swing the shields 84, 86 each slightly in a clockwise direction according to Fig. 6, the head 47ª of the rod 47 and the head of the pivot pin 42 are thus uncovered and rendered accessible, so that they may be readily withdrawn.

The operation of my device is as follows:—The parts being arranged and assembled as above described, the wagon is ready to proceed upon its journey. Normally, the various movable parts above described occupy the respective positions indicated in Fig. 2. In this event, the several scraper blades are adapted to strip the mud from the wheels if the character or quantity of the mud requires no special attention. It sometimes happens, however, that the mud is very tenacious or from some other cause it may be desirable to force the scraper blades into closer engagement with the wheels. The operator thereupon grasps the hand lever 78 and the pawl handle 82. By aid of the pawl handle, he disengages the pawl 83 from the rack 80. He next draws the hand lever 78 backward, and in so doing rocks the lever 70 in a direction which is counter-clockwise according to Fig. 2. By doing this, motion is transmitted through the link 69 and bar 29 so that the arms 25, 34, are actuated and the rocking shafts 24, 36, slightly turn. This brings the scraper blades into more favorable position for stripping the mud from the wheels as the latter roll along.

In some instances, it may be desirable to dismantle a part of the mechanism associated with the rear wheels, for the purpose, for instance, of enabling the wagon bed to be tilted in order that the load carried by it may be readily dumped to the rear of the wagon. In order to thus dismantle the scraper mechanism, the hand lever 85 (see Fig. 6) is moved bodily to the left so as to turn the shields 84, 86. This uncovers the head 47$^a$ of the rod 47 and also the head of the adjacent pivot pin 42. The operator now grasps the head 47$^a$ and completely withdraws the rod 47. He also takes out the adjacent pivot pins 42. This disengages the eyes 46 and 41$^a$. The strap sections 45, 41 therefore become detached, it being understood, however, that the tap nuts 59 are first loosened. The scraper mechanism at the rear of the wheels is thus completely dismantled. This part of the apparatus is of special service in instances where it is desirable to deliver a load into a grain chute or the like.

I do not limit myself to the particular mechanism shown for the reason that variations may be made therein without departing from the spirit of my invention.

I claim:—

A device of the character described, comprising a vehicle provided with wheels, scraper blades movable relatively to said wheels, rocking shafts connected with said scraper blades, a hand lever, a link connected therewith, a second lever connected with said link, connections from said second lever to said rocking shafts, and a pair of tensile springs connected with said second mentioned lever for holding the same in a predetermined normal position.

WILLIAM T. SHERMAN PATE.

Witnesses:
 HENRY P. SPLITGERBER,
 THOMAS J. SARE.

Copies of this patent may be obtained for five cents each, by addressing the "Commissioner of Patents, Washington, D. C."